United States Patent [19]

Arai

[11] Patent Number: 4,661,032

[45] Date of Patent: Apr. 28, 1987

[54] BILATERAL MASTER-SLAVE MANIPULATOR CONTROL DEVICE

[75] Inventor: Tatsuo Arai, Yatabemachi, Japan

[73] Assignee: Agency of Industrial Science & Technology, Ministry of International Trade & Industry, Tokyo, Japan

[21] Appl. No.: 810,263

[22] Filed: Dec. 18, 1985

[30] Foreign Application Priority Data

Dec. 20, 1984 [JP] Japan .............................. 59-269516

[51] Int. Cl.$^4$ .............................................. B25J 3/04
[52] U.S. Cl. .......................................... 414/5; 901/6; 901/8; 901/15; 901/9; 364/513; 318/568
[58] Field of Search ...................... 414/5, 2, 3, 4, 730, 414/729, 735; 901/6, 3, 8, 15, 16, 17, 50, 9; 364/513, 568, 191, 192; 318/568

[56] References Cited

U.S. PATENT DOCUMENTS

| | | | |
|---|---|---|---|
| 3,920,972 | 11/1975 | Corwin, Jr. et al. | 364/513 |
| 4,260,319 | 4/1981 | Motoda et al. | 901/15 X |
| 4,510,574 | 4/1985 | Guittet et al. | 414/5 X |
| 4,511,985 | 4/1985 | Inaba et al. | 364/513 |

*Primary Examiner*—Terrance L. Siemens
*Attorney, Agent, or Firm*—Oblon, Fisher, Spivak, McClelland & Maier

[57] ABSTRACT

A control device provided between a master device having a given articulation configuration and a given degree of freedom and a slave manipulator having a given articulation configuration and a given degree of freedom, for causing faithful operation of the slave manipulator according to operation command signals from the master device, comprising: a first position coordinate converter for converting signals of position information concerning articulations of the master device into signals of position information concerning a hand of the master device in a common operating space coordinate system; a selector for selecting specific signals from the output signals of said first position coordinate converter; a second position coordinate converter for converting the signals supplied by said selector into signals of position information concerning the articulations of the slave manipulator; a first controller for giving drive force signals to actuators for the slave manipulator according to the differences between the output signals from said second position coordinate converter and position information signals from the slave manipulator; a first force coordinate converter for converting signals of force information concerning articulations detected by the slave manipulator into signals of force information concerning a hand of the slave manipulator in the common operating space coordinate system; a second force coordinate converter for converting the signals of force information concerning the hand of the slave manipulator into signals of force information concerning the articulations of the master device, and a second controller for giving drive force signals to actuators for the master device according to the differences between the output signals from said second force cordinate converter and force information signals detected by the master device.

6 Claims, 12 Drawing Figures

BILATERAL MASTER-SLAVE MANIPULATOR CONTROL DEVICE

FIELD OF THE INVENTION AND RELATED ART STATEMENT

This invention relates to a bilateral master-slave manipulator control device and, more particularly, to a control device, to be provided between a master device and a slave manipulator having different configurations and different degrees of freedom, for faithfully operating the slave manipulator according to operation command signals from the master device.

In this specification, the statement that the master device and the slave manipulator have different configurations means, for instance, that the master device is constituted as an articulation type manipulator and the slave manipulator is constituted as a manipulator of a different type, i.e., a polar coordinate type or a cylindrical coordinate type. The manipulators have different articulations.

It is desired to use robots for operations that have to be carried out under hazardous circumstances such as in the vicinity of nuclear reactors, in space or at the bottom of the sea. With today's technology, it is difficult to realize a robot which can freely enter a hazardous environment and carry out operations requiring a certain degree of intelligence. Thus, it is a well-known and common practice for a human to control an operating robot through teleoperation.

For controlling a manipulator through teleoperation, it is effective to use a bilateral master-slave manipulator which enables the operator to sense the slave side reaction forces. In the conventional bilateral master-slave manipulator the master device and the slave manipulator are given the same configuration in order to simplify the control. In this case, however, the master device has inferior operability or lacks in versatility. From the standpoint of operability and versatility, therefore, it is effective to use a master device and a slave manipulator having different configurations suited to the given purpose.

The inventor has proposed a bilateral master-slave manipulator device with manipulators having different configurations (Japanese Patent Application Disclosure SHO 60(1985)-155384).

According to the proposed device, manipulators having different configurations can be used in combination. For instance, an articulated type manipulator can be used as the master device and a polar coordinate type manipulator as the slave manipulator. The operability and versatility can thus be improved. In the proposed device, however, even though the given purpose, the master device and the slave manipulator still have the same degrees of freedom. In this respect, the proposed device fails to provide complete versatility.

OBJECT AND SUMMARY OF THE INVENTION

An object of the invention is to provide a manipulator control device which permits reliable and ready bilateral control even though the master device and the slave manipulator have different configurations and different degrees of freedom.

To attain the above object of the invention, there is provided a control device provided between a master device having a given articulation configuration and a given degree of freedom and a slave manipulator having a given articulation configuration and a given degree of freedom, for causing faithful operation of the slave manipulator according to operation command signals from the master device, comprising:

a first position coordinate converter for converting signals of position information concerning articulations of the master device into signals of position information concerning a hand of the master device in a common operating space coordinate system and outputting the converted signals;

a selector for selecting specific signals from the output signals of said first position coordinate converter and supplying the specific signals to corresponding articulations of the slave manipulator;

a second position coordinate converter for converting the signals supplied by said selector into signals of position information concerning the articulations of the slave manipulator and outputting the converted signals;

a first controller for giving drive force signals to actuators for the slave manipulator according to the differences between the output signals from said second position coordinate converter and position information signals from the slave manipulator;

a first force coordinate converter for converting signals of force information concerning articulations detected by the slave manipulator into signals of force information concerning a hand of the slave manipulator in the common operating space coordinate system;

a second force coordinate converter for converting the signals of force information concerning the hand of the slave manipulator in the common operating space coordinate system into signals of force information concerning the articulations of the master device and outputting the converted signals; and a second controller for giving drive force signals to actuators for the master device according to the differences between the output signals from said second force coordinate converter and force information signals detected by the master device.

With the manipulator control device having the above construction, the operation of the hands of the master device and slave manipulator is expressed with common operating space coordinates, and the difference in the articulation structure and degree of freedom between the master device and the slave manipulator is overcome by the selection of control coordinates by a control coordinate selector and addition of restrainment conditions by a restrainment signal generator. Thus, manipulators of various different types can be smoothly coupled together as the master device and the slave manipulator.

The above and other objects and features of the invention will become more apparent from the following description of the preferred embodiments with reference to the accompanying drawings.

DETAILED DESCRIPTION OF THE PREFERRED EMBODIMENTS

Figure 1A:
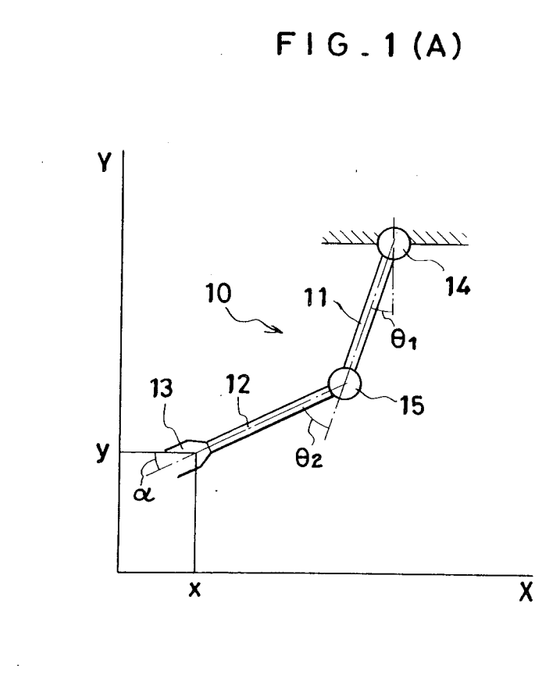
FIG. 1(A) is a schematic view showing an articulated type manipulator with two degrees of freedom which can be used as either a master device or a slave manipulator according to the invention.
Figure 1B:
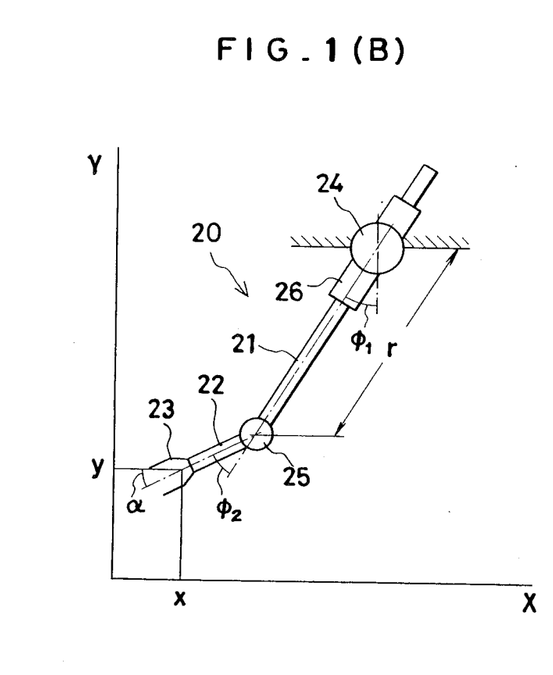
FIG. 1(B) is a schematic view showing a polar coordinate manipulator with three degrees of freedom which can also be used as either a master device or a slave manipulator.

FIGS. 1(A) and 1(B) illustrate manipulators which can be used as either master devices or slave manipulators according to the invention. Manipulator 10 shown in FIG. 1(A) is of articulated type and has two degrees of freedom. A first arm 11 is coupled at one end by an articulation 14 to a base with $\theta_1$ degree of rotational freedom. The other end of the first arm 11 is coupled by an articulation 15 to one end of a second arm 12 with $\theta_2$ degree of freedom of rotation. The second arm 12 has a hand 13 provided at the other end. Manipulator 20 shown in FIG. 1(B) is of polar coordinate type and has three degrees of freedom. A first arm 21 is coupled via an extensible joint 26 by an articulation 24 to a base with $\phi_1$ degree of freedom of rotation and with $\gamma$ degree of longitudinal freedom. The other end of the first arm 21 is coupled by an articulation 25 to one end of a second arm 22 with $\phi_2$ degree of freedom of rotation. The second arm 22 has a hand 23 provided at the other end.

Where the manipulators 10 and 20 are utilized as a master device and a slave manipulator respectively, information on the position and force of the articulations of the two manipulators cannot be directly compared. Accordingly, in order to express the positions of the hands of the two manipulators, there is introduced a common operating space coordinate system of the same dimensional order as the number of degrees of freedom of whichever of the master device and the slave manipulator has the greater number of degrees of freedom. The positions of and forces generated by the hands are compared in this common coordinate system. To this end, it is necessary to effect coordinate conversion, i.e., conversion of the position and force information of the articulations into the position and force information of the hands of the manipulators in the common operating space coordinate system. Further, since the two manipulators have different degrees of freedom, appropriate selection of coordinates in the operating space coordinate system and addition of restrainment conditions are necessary. There are cases where the number of degrees of freedom of the master device is greater and other cases where that of the slave manipulator is greater. Examples of these cases will now be described.

Figure 2:
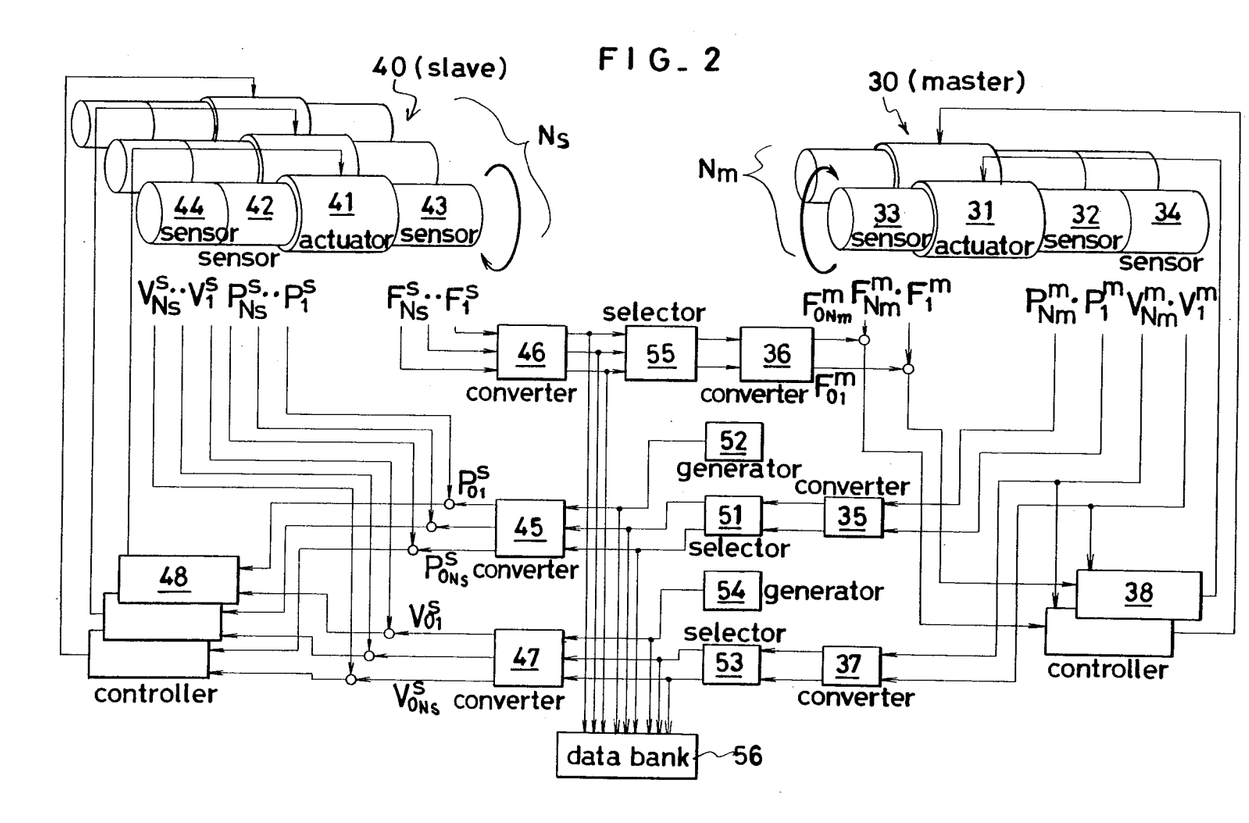
FIG. 2 is a schematic representation of an embodiment of the manipulator control device according to the invention adapted for use when the number of degrees of freedom of the slave manipulator is greater than that of the master device.

FIG. 2 shows an embodiment of the manipulator control device according to the invention. In this case, the number of degrees of freedom of the slave manipulator is greater than that of the master device.

The master device 30 and the slave manipulator 40 may be of any desired configuration, e.g., articulated type, polar coordinate type, Cartesian coordinate type and cylindrical coordinate type.

In FIG. 2, the articulations of the master device 30 and the slave manipulator 40 are shown schematically. Shafts of the articulations of the master device 30 and the slave manipulator 40 are provided with actuators 31, 41, e.g., motors, for generating drive force, position sensors 32, 42, e.g., potentiometers, for detecting the positions of arms or shafts driven by the actuators, force sensors 33, 43, e.g., torque sensors, for detecting reaction forces acting on the arms or the like, and speed sensors 34, 44, e.g., tachogenerators. The master device 30 and the slave manipulator 40 respectively have Nm and Ns (Nm<Ns) articulations, the numbers Nm and Ns corresponding to the numbers of degrees of freedom. That is, Nm and Ns actuators 31, 41 and sensors 32, 33 and 34, 42, 43 and 44 are provided on the master and slave sides, respectively. In the illustrated embodiment (FIG. 2) the master device has two degrees of freedom and the slave manipulator three.

Since the master device 30 and the slave manipulator 40 are of different types having different articulation configurations, information concerning the hands of the manipulators is coordinate converted into information in a common operating space coordinate system. The dimensional order of the operating space coordinate system is the same as the number Ns of degrees of freedom of the slave manipulator. A control system for the coordinate conversion includes position coordinate converters 35, 45, force coordinate converters 36, 46 and velocity coordinate converters 37, 47 belonging to the master device 30 and the slave manipulator 40. The operating space coordinate system may be a Cartesian coordinate system or any other coordinate system suited to the operation.

Further, since the master device 30 and the slave manipulator 40 are different in the degrees of freedom, it is necessary to establish the same degrees of freedom.

To this end, a control coordinate selector 51 is provided between the position coordinate converters 35 and 45 for selecting coordinates in the operating space coordinate system of the slave manipulator 40 that are to be controlled directly from the master side. A slave restraint signal generator 52 provides a restraint signal with respect to the remaining coordinates of the slave manipulator.

A similar control coordinate selector 53 and slave restraint signal generator 54 are connected between the velocity coordinate converters 37 and 47.

As for force information that is fed from the slave side back to the master side, a control coordinate selector 55 for selecting only force information concerning the control coordinates that are controlled from the master side is connected between force coordinate converters 36 and 46.

In the control device of the above construction, the master side position sensors 32 detect the positions of the articulations of the master device 30 and feed signals $P_1^m \ldots P_{nm}^m$ representing detected position information to the position coordinate converter 35. The position coordinate converter 35 converts input signals $P_1^m \ldots p_{nm}^m$ to signals representing the hand position of the master device, and these signals are fed to a control coordinate selector 51. In the control coordinate selector 51 specific operation space coordinates are selected on the basis of the purpose of the operation and the configuration of the slave manipulator, and the selected signals are sent to the position coordinate converter 45. The slave restraint signal generator 52 feeds to the position coordinate converter 45 restraint signals for restraining the remaining coordinates in the operation coordinate system that are not controlled by the control coordinate selector 51.

As an example, a system will be considered, in which the manipulator 10 shown in FIG. 1(A) is used as the master device and the manipulator 20 shown in FIG. 1(B) is used as the slave manipulator. The control coordinate selector 51 selects control signals for two coordinates in the operation space coordinate system, i.e., three coordinates of x, y and hand orientation which are in the ranges of movement of the master device and the slave manipulator. For example, when it is selected to control the x- and y-coordinates from the master side, for the hand orientation coordinate a restraint signal to hold the angle is generated from the slave restraint signal generator 52 and fed to the position coordinate converter 45.

The position information signals that are fed to the slave side position coordinate converter 45 in this way are converted in the converter 45 from signals representing a hand position in the operation space coordinate system to position signals $P_{01}^s \ldots P_{0Ns}^s$ of articulation coordinates of the slave manipulator 40. The converted position signals are compared with the position information signals $P_1^s \ldots P_{Ns}^s$ from the slave side position sensors 42 respectively. Each of the resultant difference signals is fed to the controller 48 to drive the slave side actuator 41.

Thus, the hand of the slave manipulator 40 follows and is moved in the same way as the hand of the master device 30.

Meanwhile, in order to feed force information signals $F_1^s \ldots F_{Ns}^s$ detected by the slave side force sensors 43 back to the master side, the outputs of the force sensors 43 are fed to the force coordinate converter 46. The force coordinate converter 46 converts the force information signals in the articulation coordinate system of the slave manipulator 40 into force signals of the hand in the operating space coordinate system and forwarded the converted force signals to a control coordinate selector 55. Of these force signals, those of the control coordinates which are not directly controlled from the master device need not be fed back. In this respect, in the selector 55, the force signals concerning control coordinates that are required to be fed back to the master side are selected and forwarded to a master side force coordinate converter 36. The force coordinate converter 36 converts the force signals concerning the hand in the operating space coordinate system into force signals concerning the hand of the master device 30 in the articulation coordinate system. The converted signals $F_{01}^m \ldots F_{0Nm}^m$ of the force information is compared with the force information signals $F_1^m \ldots F_{Nm}^m$ from the master side force sensors 33. The force controllers 38 feed driving forces to the master side actuators 31 according to the differences determined by the comparison. Thus, when a reaction force due to interference from an object concerned or the like is produced on the side of the slave manipulator 40, it is reliably transmitted to the master device.

The control system described above basically performs the position control of the slave manipulator 40 and the force control of master device 30. To improve the control response, the following velocity control is effected.

The velocity information signals $V_1^m \ldots V_{Nm}^m$ of the coordinate system detected by the master side speed sensors 34 are converted in the velocity coordinate converter 37 into velocity signals concerning the hand in the operating space coordinate system. Then the control coordinate selector 53 selects coordinates that are to be controlled directly from the master side in the operating space coordinate system. At the same time, the slave restraint signal generator 54 provides a restraint signal to the velocity coordinate converter 47 with respect to the remaining coordinates which are not selected by the selector 53.

The velocity coordinate converter 47 converts the velocity signals thus received into signals $V_{01}^s \ldots V_{oNm}^s$ with the articulation system of slave manipulator 40. The converted signals are compared with the velocity information signals $V_1^s \ldots V_{Ns}^s$ detected by the slave side speed sensors 44. The controllers 48 control the slave side actuators 41 according to the differences determined by the comparison.

In the master device 30, velocity information signals $V_1^m \ldots V_{Nm}^m$ from the master side speed sensors 34 are fed back to the actuators 31 through the controllers 38 for force control.

A data bank 56 is connected between the master side converters 35, 36 and 37 and the slave side converters 45, 46 and 47 for conversion of the articulation coordinate system and the velocity coordinate system on the master and slave sides. Thus, information exchange between the master and slave side converters can be carried out with the common operating space coordinate system. Information stored in the data bank 56 can be utilized as common data to all the manipulators for teaching, reproduction, etc.

Figure 3:
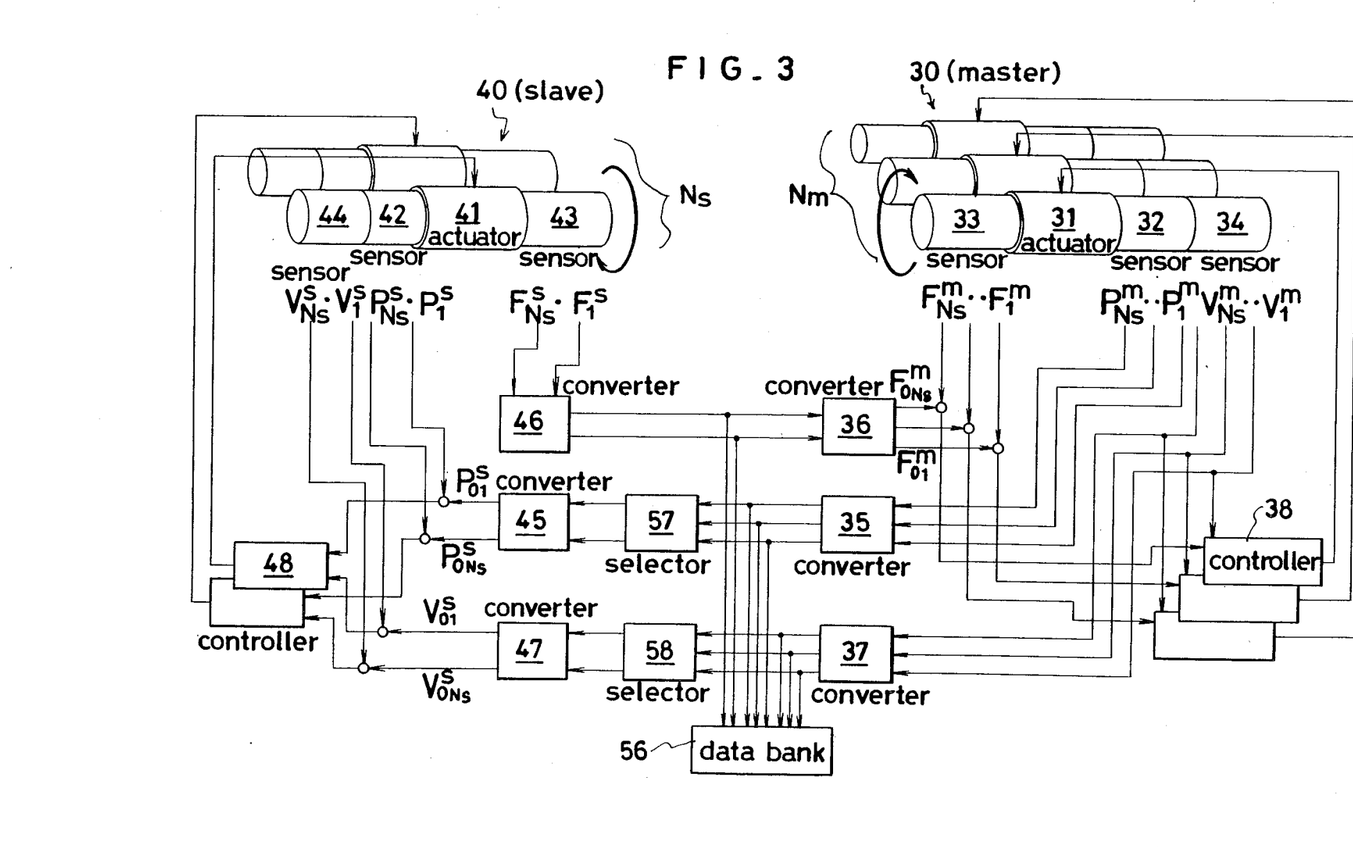
FIG. 3 is a schematic representation of another embodiment of the manipulator control device according to the invention adapted for use when the number of degrees of freedom of the master device is greater than that of the slave manipulator.

FIG. 3 shows another embodiment of the manipulator control device. In this case, the number of degrees of freedom of the master device is greater than that of the slave manipulator.

Like FIG. 2, in FIG. 3 the articulations of a master device 30 and a slave manipulator 40 are shown schematically. The shafts of the individual articulations are provided with actuators 31, 41, position sensors 32, 42, force sensors 33, 43 and speed sensors 34, 44.

Since the master device 30 and the slave manipulator 40 are of different types having different articulation configurations, it is necessary to effect coordinate conversion between the articulation coordinate system and a common operating space coordinate system. Similarly to the preceding embodiment, a control system for the coordinate conversion comprises position coordinate converters 35, 45, force coordinate converters 36, 46 and velocity coordinate converters 37, 47 belonging to the master device 30 and the slave manipulator 40. These coordinate converters have the same functions as the corresponding converters in the preceding embodiment.

Further, since the number $N_m$ of degrees of freedom of the master device 30 is greater than the number $N_s$ of degrees of freedom of the slave manipulator 40, the information signals from the master device have to be equal in number to the degrees of freedom of the slave manipulator.

Accordingly, position information signals $P_1^m \ldots P_{Nm}^m$ concerning the articulations of the hand of the master device 30, provided from the master side position sensors 32, is fed to the position coordinate converter 35. The position coordinate converter 35 converts the input information signals into position signals of the hand in the operating space coordinate system of the dimensional order $N_m$, these position signals being fed to a control coordinate selector 57. The control coordinate selector 57 selects only position signals suited to the degrees of freedom of the slave manipulator 40. The selected position signals are fed to the position coordinate converter 45 for conversion to position signals $P_{01}^s \ldots P_{0Ns}^s$ concerning the articulations of the slave manipulator 40. These position signals are compared with position information signals $P_1^s \ldots P_{Ns}^s$ from the slave side position sensors 42. Controllers 48 drive the slave side actuators 41 according to the differences determined by the comparison as correction signals to cause the operation of the master device hand to be followed by the operation of the slave manipulator hand. Likewise, velocity information signals $V_1^m \ldots V_{Nm}^m$ concerning the master device articulations, from the speed sensors 34, is converted in the velocity coordinate converter 37 into the master device velocity information signals in the common operating space coordinate system. Of these signals only given signals are selected in consideration of the degrees of freedom of the slave manipulator by a control coordinate selector 58. The velocity coordinate converter 47 converts the selected signals into signals concerning the slave manipulator articulations, these signals being compared with signals $V_1^s \ldots V_{Ns}^s$ from the speed sensors 44. The controllers 48 control the driving of the slave side actuators 41 according to the difference determined by the comparison.

As for force information fed back from the slave side to the master side, because the number of degrees of freedom of the slave side is smaller than that of the master side, no force information is fed back with respect to some coordinates of the master side in the operating space coordinate system.

More specifically, force inormation signals $F_1^s \ldots F_{Ns}^s$ from the slave side force sensors 43 are fed to the force coordinate converter 46. The force coordinate converter 46 converts force signals in the articulation coordinate system into force signals concerning the hand in the operating space coordinate system. The force coordinate converter 36 converts the signals concerning the hand on the slave side into force signals $F_{01}^m \ldots F_{0Nm}^m$ in the articulation coordinate system concerning the hand on the master side. The converted signals are compared with the signals $F_1^m \ldots F_{Nm}^m$ from the master side force sensor 33. Controllers 38 feed back the differences determined by the comparison as correction signals to actuators 31, whereby the force generated at the slave side hand is reliably reproduced at the master side hand. Data between the master and slave side coordinate converters are stored in a data bank 56 and can be utilized as common data to all the manipulators in the same manner as in the preceding embodiment.

Since the master device and the slave manipulator have different configurations and degrees of freedom, the ranges of movement of the hands of the two sides may not coincide. In such a case, the operation on the master side according to command signals may not be faithfully reproduced on the slave side. Troubles that occur due to a difference between the movement ranges of the master device and the slave manipulator are eliminated in a manner which will now be described with reference to FIGS. 4 to 6.

Figure 4:
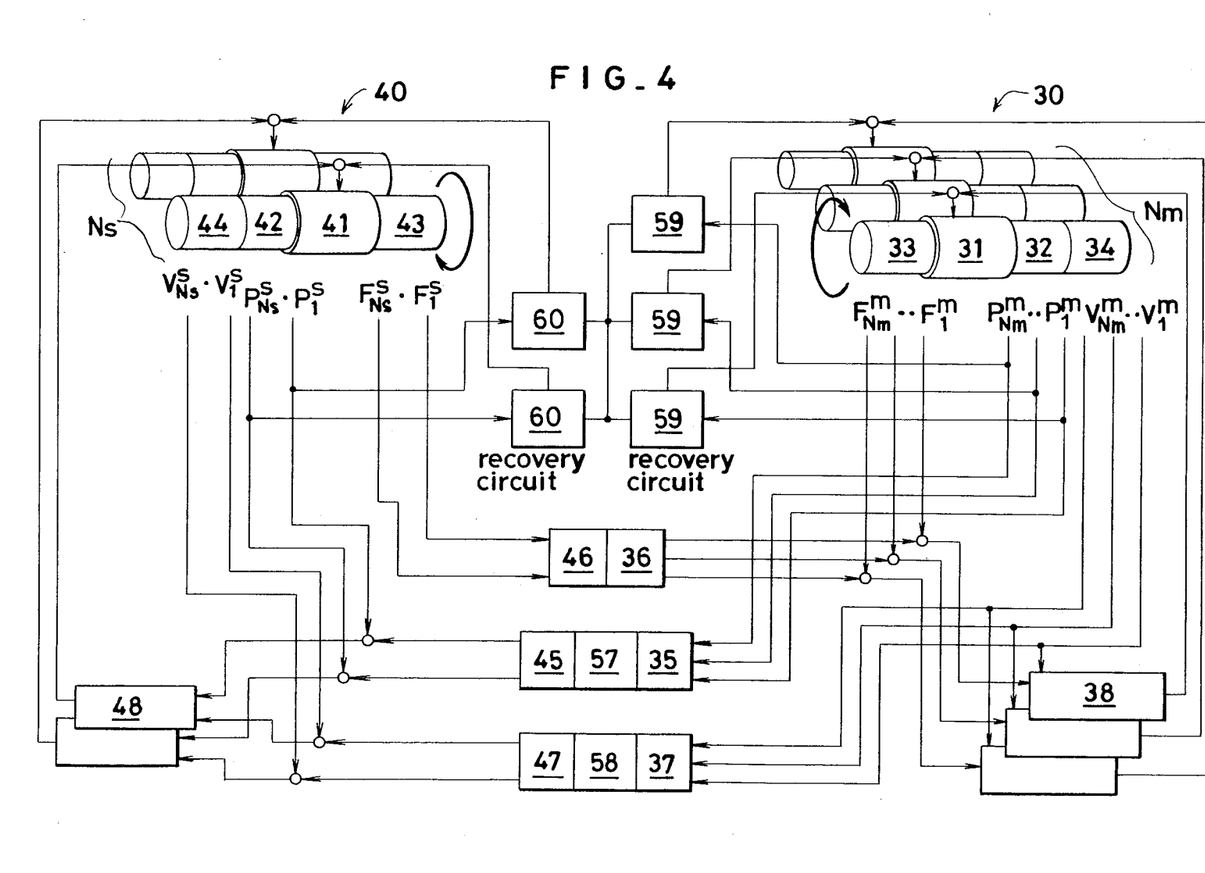
FIG. 4 is a schematic representation of a first embodiment of the manipulator control device according to the invention adapted for controlling the difference in operable range between the master device and the slave manipulator.

The control device shown in FIG. 4 basically has the same construction as the control device shown in FIG. 3. Output signals $P_1^m \ldots P_{Nm}^m$ from the master side position sensors 32 and output signals $P_1^s \ldots P_{Ns}^s$ from the slave side position sensors 42 are fed respectively to initial state recovery circuits 59 and 60 in which limit values of rotation angles of all the articulations have been preliminarily stored. When the rotation angle of any one of the articulations has reached the corresponding limit value, the initial state recovery circuits immediately issue signals for stopping the actuators 31 and 41 on both the master and slave sides and subsequently issue signals for recovering the articulations to the initial state to the actuators 31 and 41.

Figure 5:
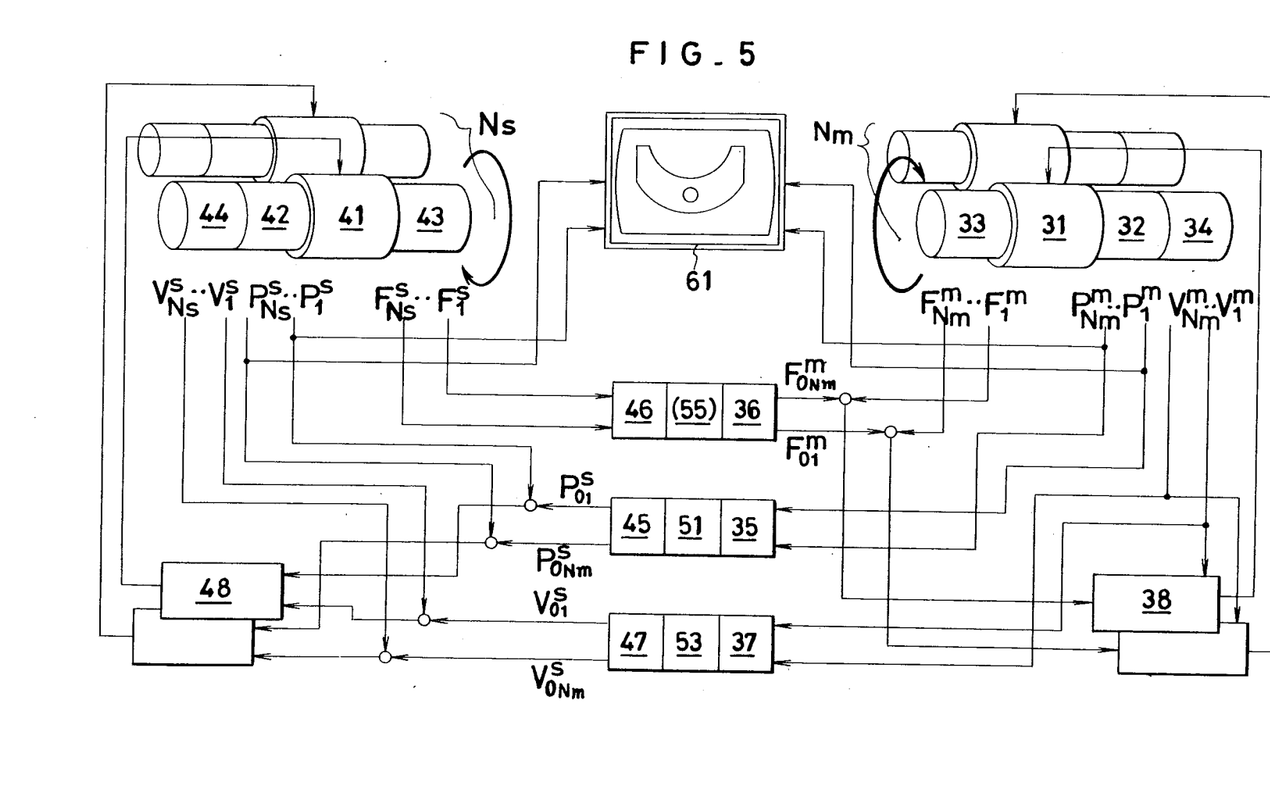
FIG. 5 is a schematic representation of a second embodiment of the manipulator control device according to the invention adapted for controlling the difference in operable range between the master device and the slave manipulator.

It is possible to use an operation indicator such as a monitor display in place of the initial state recovery circuit. FIG. 5 shows an embodiment which uses such an operation indicator. Referring to FIG. 5, an operation indicator 61 which includes a monitor display, is connected between master and slave side position sensors 32 and 42. The operation indicator 61 displays the operation range on a monitor display, with the display of the positions of the hands of the master device 30 and the slave manipulator 40 in the operation range. The operator operates the master device 30 while watching the monitor display on the operation indicator 61, thereby preventing deviation of the hand positions of the master and slave sides from the operation range.

Figure 6:
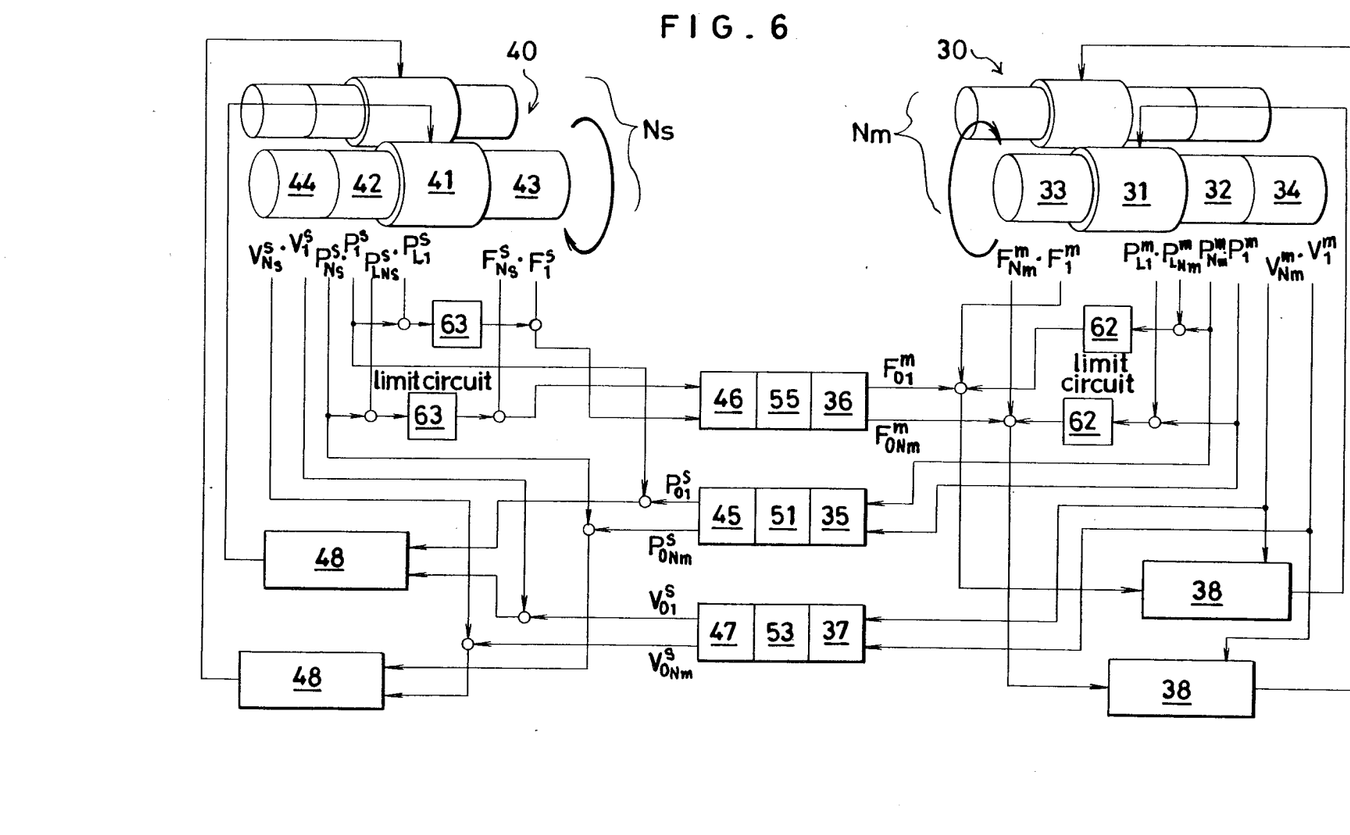
FIG. 6 is a schematic representation of a third embodiment of the manipulator control device according to the invention adapted for controlling the difference in operable range between the master device and the slave manipulator.

FIG. 6 shows a further modification of the above control device. In this instance, operation range limit circuits 62 and 63 are provided in the master and slave sides respectively. When the limit of the operation range is reached on either the master or slave side, a force for returning the hand position to the operation range is generated.

To be specific, the output signals $P_1^m \ldots P_{Nm}^m$ detected by the position sensors 32 are compared with predetermined operation range limit values $P_{L1}^m \ldots P_{LNm}^m$ and the resultant differences are fed to limit circuits 62 respectively. When any one of the differences has reached a preset value for example, the corresponding limit circuit 62 issues a signal to the corresponding actuator 31 via a controller 38. As a result, the actuator 31 actuates a master device 30 falling on the operation range boundary to be restored within the operation range. On the slave side, the position signals $P_1{}^s \ldots P_{Ns}{}^s$ are compared with predetermined operation range limit values $P_{L1}{}^s \ldots P_{LNs}{}^s$ and the resultant differences are fed to limit circuits 63 respectively. When any one of the differences has reached a preset value, for example, the corresponding limit circuit 63 issues an output signal which is added as restoring force information to one of force information signals $F_1{}^s \ldots F_{Ns}{}^s$, detected by force sensors 43. The combined signal is fed back to the master side when the slave manipulator 40 falls on the operation range boundary, thereby restoring the master device within the operation range.

Although FIGS. 5 and 6 expediently show the same number of shafts of the master device and the slave manipulator, the number of the degree of freedom Nm of the master device and the number of the degree of freedom Ns of the slave manipulator are actually different from each other. Further, a selector and converters are shown in combination with one another in FIGS. 4, 5 and 6, but their positions are the same as those shown in FIG. 2 or FIG. 3.

As has been shown above, according to the invention manipulators having different configurations and different degrees of freedom can be combined as a master device and a slave manipulator, and the slave manipulator can be reliably operated according to commands from the master side. In this case, however, it is necessary to design and construct a control system for each combination of master device and slave manipulator of different configurations.

Figure 7:
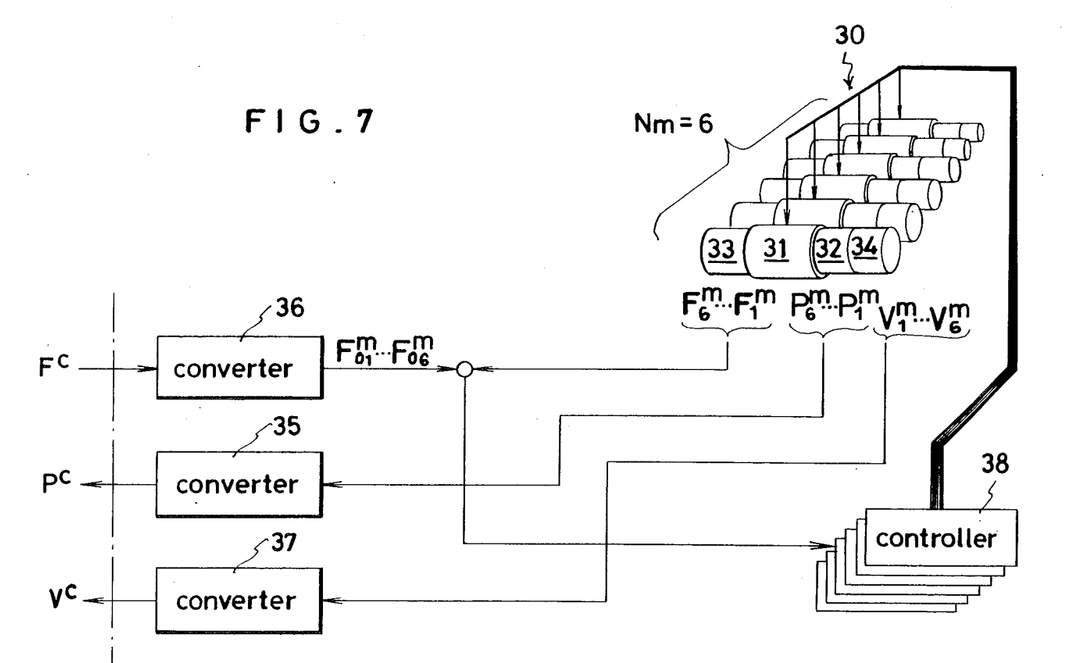
FIG. 7 is a schematic representation of a further embodiment of the manipulator control device according to the invention, in which a control system for the master side is included together with the master device in a module.
Figure 8:
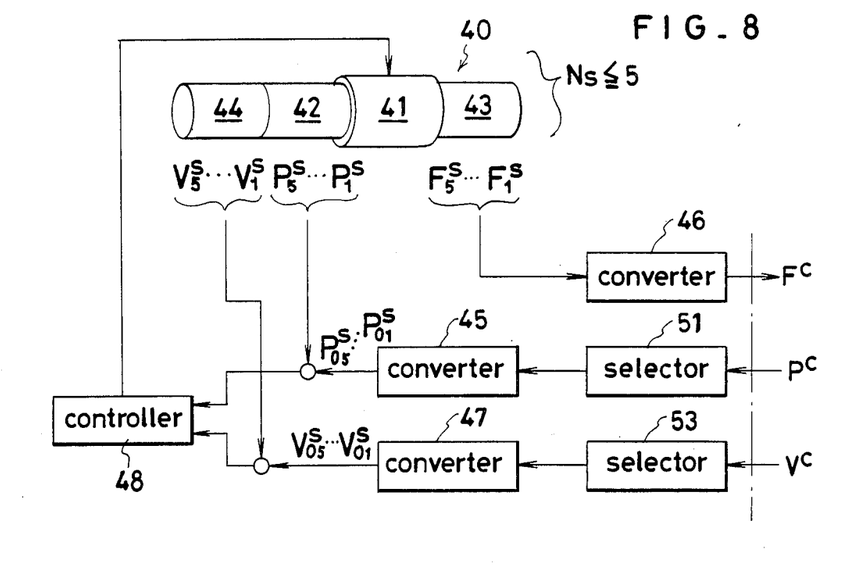
FIG. 8 is a schematic representation of a further embodiment of the manipulator control device according to the invention, in which a control system for a slave side with a smaller number of degrees of freedom than the master side is included in a module.
Figure 9:
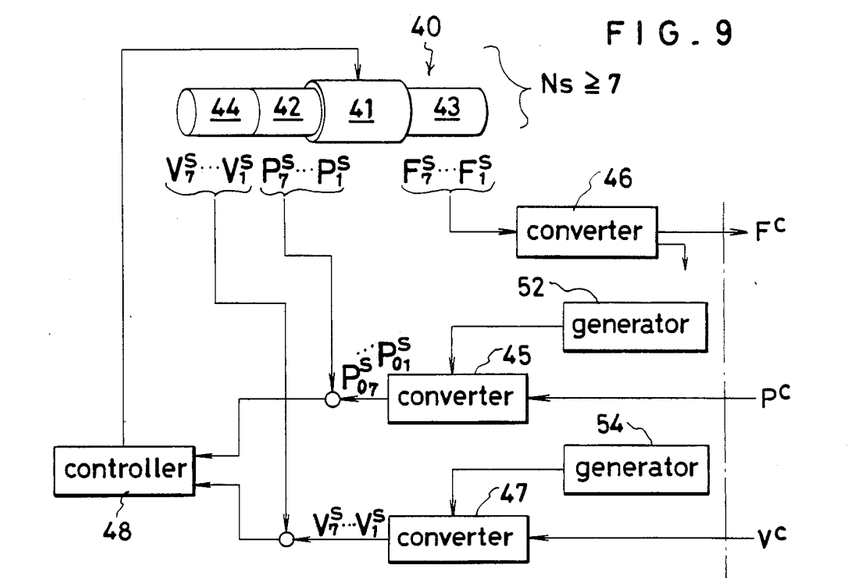
FIG. 9 is a schematic representation of a further embodiment of the manipulator control device according to the invention, in which a control system for a slave side with a larger number of degrees of freedom than the master side is included in a module.

In this respect, a control system which has high versatility and permits manipulators having different configurations and different degrees of freedom to be coupled together very easily and without need for designing and constructing special control systems is desired. The construction of such a control system will now be described. Where the manipulator selected as the master device has six degrees of freedom as the utmost versatility, i.e., Nm is 6, the manipulator 30 shown in FIG. 2 has six actuators 31, position sensors 32, force sensors 33 and speed sensors 34. Six position, speed and force coordinate converters 35, 37 and 36 for these are included together with the controllers 38 and master device in a module, as shown in FIG. 7. For the transfer of signals with respect to the slave side, force signals $F^c$ in the operating space coordinate system are received as input signals, and position and velocity signals $P^c$ and $V^c$ in the operating space coordinate system are provided as output signals.

Where a manipulator of five or less degrees of freedom is connected to such a master module shown in FIG. 7, a slave module including position, velocity and force coordinate converters 45, 46 and 47, position and velocity control coordinate selectors 51 and 53, controller 48 and slave manipulator is formed, as shown in FIG. 8. For the transfer of signals with respect to the master side, position and velocity signals $P^c$ and $V^c$ in the operating space coordinate system are received as input signals, force signal $F^c$ in the operating space coordinate system is provided as the output signal.

Where a manipulator with seven or more degrees of freedom is connected as the slave manipulator, position, velocity and force coordinate converters 45, 46 and 47, position and velocity restrainment signal generators 52 and 54 and the slave manipulator are included in a slave module, as shown in FIG. 9. The transfer of signals with respect to the master side is entirely the same as in the case of the slave module with five or less degrees of freedom.

Figure 10:
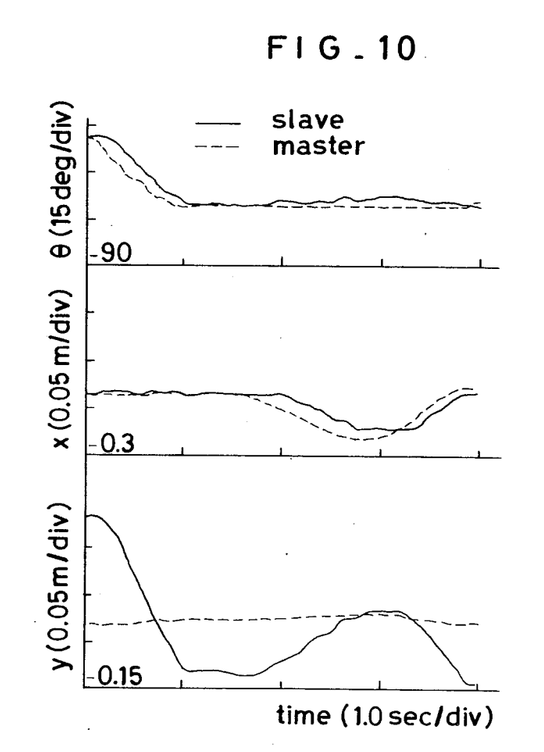
FIG. 10 is a graph showing position tracking of a slave manipulator with respect to a master device.

Since the position, force and velocity $P^c$, $F^c$ and $V^c$ signals are standardized, it is possible to readily couple a slave module of any degrees of freedom to the high versatility master module. It is thus possible to further extend the versatility of the bilateral master-slave manipulator consisting of manipulators having different configurations and different degrees of freedom Experiments were conducted on (i) the position tracking property of the slave manipulator with respect to the master device and (ii) the force tracking property of the master device with respect to the slave manipulator using the polar coordinate type manipulator with three degrees of freedom shown in FIG. 1(B) as the master device and the articulated type manipulator with two degrees of freedom as shown in FIG. 1(A) as the slave manipulator. Operational processing was performed using a TI 990/20 mini-computer. For the position tracking property of the slave manipulator, the hand of the slave manipulator was made free to move, and a master side operating terminal was manually operated by the operator. Position data on both sides obtained in this way were compared. Since the master side had three degrees of freedom while the slave side had two degrees of freedom, only the x-coordinate and $\theta$-coordinate on the slave side were controlled from the master side. The results are as shown in FIG. 10. As is seen, the tracking is satisfactory in the $\theta$- and x-coordinates. A value of the y-coordinate depends on the movement in the $\theta$- and x-coordinates.

Figure 11:
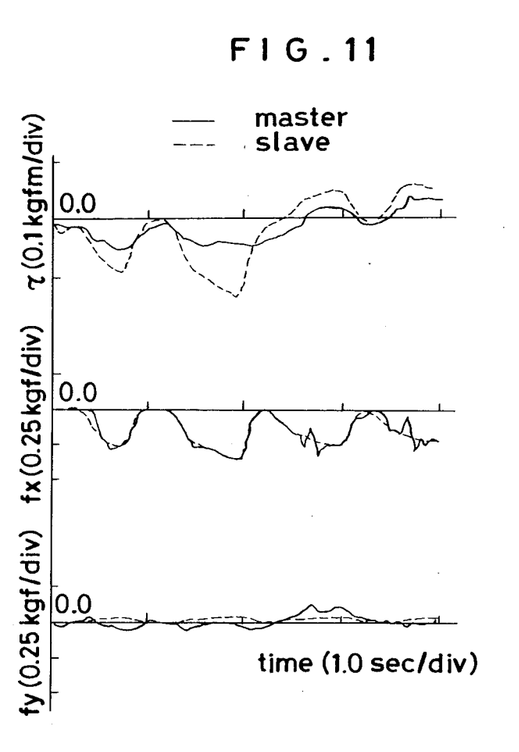
FIG. 11 is a graph showing force tracking of a master device with respect to a slave manipulator.

For the force tracking property of the master device, a master side operating terminal was held fixed, and suitable forces were applied to a slave side terminal by the operator. Torque data thus obtained from the torque sensors on both sides were compared on the common coordinate system. The results are as shown in FIG. 11. It will be seen that satisfactory tracking has been obtained with respect to the $\theta$- and x-coordinates which are directly controlled. In the graph of FIG. 11, $\tau$, fx and fy on the longitudinal axis represent the torque exerted in the $\theta$ direction, the force exerted in the x direction and the force exerted in the y direction, respectively. It is noted from the graph that the torque variation on the slave side is, on the whole, transmitted to the master side with respect to the $\theta$- and x-coordinates.

What is claimed is:

1. A control device provided between a master device having a given articulation configuration and a given degree of freedom and a slave manipulator having a given articulation configuration and a given degree of freedom, for causing faithful operation of the slave manipulator according to operation command signals from the master device, comprising:
   a first position coordinate converter for converting signals of position information concerning articulations of the master device into signals of position information concerning a hand of the master device in a common operating space coordinate system and outputting the converted signals;
   a selector for selecting specific signals from the output signals of said first position coordinate converter and supplying the specific signals to corresponding articulations of the slave manipulator;

a second position coordinate converter for converting the signals supplied by said selector into signals of position information concerning the articulations of the slave manipulator and outputting the converted signals;

a first controller for giving drive force signals to actuators for the slave manipulator according to the differences between the output signals from said second position coordinate converter and position information signals from the slave manipulator;

a first force coordinate converter for converting signals of force information concerning articulations detected by the slave manipulator into signals of force information concerning a hand of the slave manipulator in the common operating space coordinate system;

a second force coordinate converter for converting the signals of force information concerning the hand of the slave manipulator in the common operating space coordinate system into signals of force information concerning the articulations of the master device and outputting the converted signals; and a second controller for giving drive force signals to actuators for the master device according to the differences between the output signals from said second force coordinate converter and force information signals detected by the master device.

2. A control device according to claim 1, wherein said second position coordinate converter has connected thereto a restrainment signal generator which generates signals for restraining movement of the particulations of the slave manipulator not receiving the specific signals selected and supplied by said selector.

3. A control device according to claim 1, further comprising a selector interposed between said first force coordinate converter and said second force coordinate converter for selecting specific signals from force signals of said first force coordinate converter and supplying the specific signals to said second force coordinate converter.

4. A control device according to claim 1, further comprising an initial state restoring circuit which receives the signals of position information concerning the articulations of both the master device and the slave manipulator and detects whether the hands of the master device and the slave manipulator fall within their operation ranges.

5. A control device according to claim 1, further comprising a limit circuit which is disposed on the side of the master device for supplying returning force to the actuators for the master device when any one of the signals of position information concerning the articulations of the master device has reached a preset value to thereby return the articulations of the master device.

6. A control device according to claim 1, further comprising a limit circuit which is disposed on the side of the slave manipulator for generating an output signal to be added to the signals of force information concerning of articulations of the slave manipulator when any one of the signals of position information concerning the articulations of the slave manipulator has reached a preset value to thereby return the articulations of the master device.

* * * * *